(12) United States Patent
Van Der Velde et al.

(10) Patent No.: US 9,232,424 B2
(45) Date of Patent: Jan. 5, 2016

(54) MANAGEMENT OF STORAGE OF MEASUREMENT DATA

(75) Inventors: Himke Van Der Velde, Zwolle (NL); Gert Jan Van Lieshout, Apeldoorn (NL); Kyeong In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 13/642,663

(22) PCT Filed: Apr. 29, 2011

(86) PCT No.: PCT/KR2011/003210
§ 371 (c)(1),
(2), (4) Date: Oct. 22, 2012

(87) PCT Pub. No.: WO2011/136611
PCT Pub. Date: Nov. 3, 2011

(65) Prior Publication Data
US 2013/0040659 A1    Feb. 14, 2013

(30) Foreign Application Priority Data
Apr. 30, 2010  (GB) .................................. 1007293.2

(51) Int. Cl.
*H04W 24/00* (2009.01)
*H04W 24/10* (2009.01)
*H04W 24/08* (2009.01)

(52) U.S. Cl.
CPC .............. *H04W 24/10* (2013.01); *H04W 24/08* (2013.01)

(58) Field of Classification Search
CPC ..................................................... H04W 24/00

USPC ............................. 455/456.1, 422.1, 423, 424
See application file for complete search history.

(56) References Cited

U.S. PATENT DOCUMENTS

| | | | |
|---|---|---|---|
| 7,941,136 B2 * | 5/2011 | Reed et al. ..................... 455/424 |
| 2006/0052104 A1 | 3/2006 | Kono | |
| 2008/0133733 A1 * | 6/2008 | Hanking ....................... 709/223 |
| 2008/0281687 A1 * | 11/2008 | Hurwitz et al. ................. 705/14 |
| 2009/0091427 A1 * | 4/2009 | Shiotsu et al. ............... 340/10.1 |
| 2009/0234200 A1 * | 9/2009 | Husheer ........................ 600/301 |
| 2010/0323714 A1 * | 12/2010 | Schmidt et al. ............. 455/456.1 |
| 2011/0116386 A1 * | 5/2011 | Blanchard et al. ............ 370/242 |
| 2011/0183662 A1 * | 7/2011 | Lee et al. ..................... 455/422.1 |
| 2011/0201279 A1 * | 8/2011 | Suzuki et al. .............. 455/67.11 |
| 2011/0250880 A1 * | 10/2011 | Olsson .......................... 455/423 |
| 2012/0287902 A1 * | 11/2012 | Bufe et al. ..................... 370/331 |
| 2012/0309431 A1 * | 12/2012 | Bodog ........................ 455/456.6 |

FOREIGN PATENT DOCUMENTS

| CN | 101426224 A | 5/2009 |
|---|---|---|
| EP | 1104215 A1 | 5/2001 |
| EP | 1881720 A1 | 1/2008 |
| EP | 1 921 580 A1 * | 5/2008 |

(Continued)

*Primary Examiner* — Jinsong Hu
*Assistant Examiner* — Jean Chang
(74) *Attorney, Agent, or Firm* — Jefferson IP Law, LLP

(57) ABSTRACT

A management of storage of measurement Data is provided. A method of managing storage of a set of measurement data comprises the steps of determining whether a value of at least one of said plurality of parameters has changed by more than a threshold amount from a value of the parameter in a previously stored set of measurement data and storing the set of measurement data, dependent upon the determination being affirmative.

11 Claims, 2 Drawing Sheets

(56) References Cited

FOREIGN PATENT DOCUMENTS

| | | |
|---|---|---|
| EP | 2117141 A1 | 11/2009 |
| KR | 10-2003-0054301 A | 7/2003 |
| KR | 10-2007-0016833 A | 2/2007 |
| KR | 10-2007-0016920 A | 2/2007 |
| WO | 2008-075884 A2 | 6/2008 |
| WO | 2009-025593 A1 | 2/2009 |
| WO | 2011-136611 A2 | 11/2011 |

* cited by examiner

MANAGEMENT OF STORAGE OF MEASUREMENT DATA

TECHNICAL FIELD

The present invention relates generally to wireless networks, and more specifically, but not exclusively, to a method and apparatus for management of storage of measurement data at a user equipment of a wireless network.

BACKGROUND ART

Wireless networks, in which a user equipment (UE) such as a mobile handset communicates via wireless links to a network of base stations or other wireless access points connected to a telecommunications network, have undergone rapid development through a number of generations of radio access technology. The initial deployment of systems using analogue modulation has been superseded by second generation (2G) digital systems such as GSM (Global System for Mobile communications), typically using GERA (GSM Enhanced Data rates for GSM Evolution Radio Access) radio access technology, and these systems have themselves been replaced by or augmented by third generation (3G) digital systems such as UMTS (Universal Mobile Telecommunications System), using the UTRA (Universal Terrestrial Radio Access) radio access technology. Third generation standards provide for a greater throughput of data than is provided by second generation systems; this trend is continued with the proposals by the Third Generation Partnership Project (3GPP) of the Long Term Evolution (LTE) system, using E-UTRA (Evolved UTRA) radio access technology, which offers potentially greater capacity and additional features compared with the previous standards. WiMax systems using radio access technology to IEEE 802.16 also offer improvements over previous standards.

Wireless networks typically require measurement data to be gathered, for functions such as mobility management (e.g. handover) and radio resource management (e.g. which resources to allocate to a UE). More recently measurements have been introduced to support self optimisation of networks as well as to verify if the network is deployed well e.g. proper coverage (thereby minimising the need for so-called drive tests). In particular, it is beneficial to know the strength of signals received form wireless nodes such as base stations as a function of location. This information may be used to deduce the location of coverage holes in the network, such as due to shadowing by buildings, to detect areas of weak coverage, or areas of overshoot coverage, where coverage from a cell of the wireless network extends beyond what was planned. Measurement data may also be used to detect interference such as interference between pilot signals from different cells, and to deduce coverage areas for uplink signals. Coverage mapping, of areas with strong as well as weak signals, may depend on measurement data.

DISCLOSURE OF INVENTION

Technical Problem

Measurement data may be gathered by drive testing, in which vehicles equipped with suitable measurement equipment traverse the area of coverage of a wireless network. However, this may be expensive and inconvenient, as well as contributing to carbon dioxide pollution. Accordingly, user equipment may be used gather measurement data, as the users go about their leisure or business activities within the wireless network. User equipment may be used to gather measurement data, and to store the data to be uploaded to the wireless network. However, the amount of data gathered may be large and may impose a burden on the resources of the user equipment, for example by use of memory.

Solution to Problem

In accordance with a first aspect of the present invention, there is provided a method of managing storage of a set of measurement data, the method being suitable for use at a user equipment of a wireless network, the set of measurement data comprising a value of each of a plurality of parameters, the method comprising:
  determining whether a value of at least one of said plurality of parameters has changed by more than a threshold amount from a value of the parameter in a previously stored set of measurement data; and
  storing the set of measurement data, dependent upon the determination being affirmative. This has an advantage of reducing the amount of information to be stored at the user equipment.

In an embodiment of the invention, said at least one of said plurality of parameters is a descriptor of a geographical location, and said threshold amount relates to changes in geographical location. This has an advantage that data need not be stored for geographical locations that are closely spaced, so that for example data need not be stored for locations for which measured attributes of radio signals may not be expected to be significantly different from the attributes at locations of previously stored measurements.

The descriptor of a geographical location may be determined using a navigation system.

Alternatively or additionally, the descriptor of a geographical location may be derived from a basis including a measured attribute of a radio signal, or a plurality of radio signals from neighbouring cells.

In an embodiment of the invention, said at least one of said plurality of parameters is a measured attribute of a radio signal.

The measured attribute of a radio signal may be a power level.

In an embodiment of the invention, said at least one of said plurality of parameters is measured when usage of communication resources at the user equipment is below a predetermined value. This has an advantage that a measurement may not impact usage of the user equipment for other functions, such as voice or data communication. Embodiments of the invention may apply to both idle and connected mode.

In embodiments of the invention, measuring said at least one of said plurality of parameters is in a response to a request from the wireless network. This has an advantage that measurements may be restricted to being taken when the measurements are required by the network and the network may select which user equipments should perform such measurements.

In embodiments of the invention, the method comprises receiving a message from the wireless network indicating the threshold amount. This has an advantage that a threshold amount may be set according to the requirements of the wireless network, for example in some areas, for example areas of particular operational significance, or more heavily used areas, it may be required to take measurements at more closely spaced locations, and/or for smaller differences in a measured attribute.

In embodiments of the invention, the method comprises sending a message to the wireless network indicating that data comprising the set of measurement data is ready to be sent and preferably, the method comprises sending the set of measurement data in a response to a request from the wireless network. This has the advantage of reducing the amount of data to be stored at the user equipment between uploads of data to wireless network.

In accordance with a second aspect of the invention there is provided user equipment for use in a wireless network, the user equipment being arranged to manage storage of a set of measurement data, the set of measurement data comprising a value of each of a plurality of parameters, the user equipment being arranged to:

determine whether a value of at least one of said plurality of parameters has changed by more than a threshold amount from a value of the parameter in a previously stored set of measurement data; and store the set of measurement data, dependent upon the determination being affirmative.

Further features and advantages of the invention will be apparent form the following description of preferred embodiments of the invention, which are given by way of example only.

Advantageous Effects of Invention

In an embodiment of the invention, said at least one of said plurality of parameters is a descriptor of a geographical location, and said threshold amount relates to changes in geographical location. This has an advantage that data need not be stored for geographical locations that are closely spaced, so that for example data need not be stored for locations for which measured attributes of radio signals may not be expected to be significantly different from the attributes at locations of previously stored measurements.

MODE FOR THE INVENTION

By way of example an embodiment of the invention will now be described in the context of a wireless network including a radio access network supporting communication using E-UTRA/LTE radio access technology, as associated with E-UTRA networks. However, it will be understood that this is by way of example only and that other embodiments may involve wireless networks using other radio access technologies, such as IEEE802.16 WiMax systems; embodiments are not limited to the use of a particular radio access technology.

Figure 1:
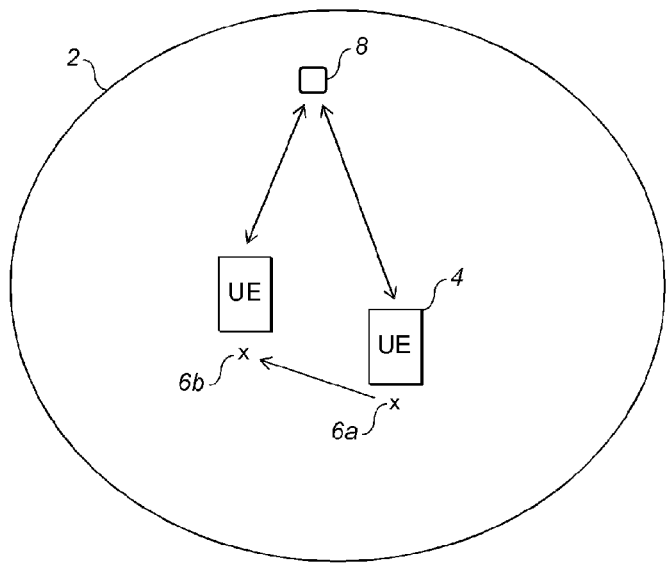
FIG. 1 is a schematic diagram illustrating a wireless network according to an embodiment of the invention.

Embodiments of the invention will be described with reference to FIG. 1, which shows a user equipment 4 in a wireless access network 2. The user equipment 4 may communicate with wireless node 8, typically an evolved Home Node B.

However, communication may be intermittent. The use of communications resources of the user equipment may be below a predetermined value, that is to say the user equipment may be in idle mode. The user equipment may move, for example from position 6a to position 6b, for example as the user goes about business or leisure activities within the area of coverage of the wireless network. The user equipment 4 may perform measurements, typically in idle mode, that relate to parameters such as an attribute of a radio signal, for example a power level, and may relate to a descriptor of a geographical location, such as a geographical coordinate. The user equipment 4 may store sets of measurement data which may include, for example, a descriptor of a geographical location and an attribute of a radio signal received by the user equipment at the geographical location. A set of measurement data may be stored if it is determined that at least one of the parameters has changed by more than a threshold amount from a value of the parameter in a previously stored set of measurement data. For example, the geographical location of the user equipment may have changed by more than a threshold amount, or an attribute of a radio signal may have changed by more than a threshold amount. In this way, the amount of measurement data stored is minimised. The measurement of the parameters may be dependent on receiving a request from the wireless network 2, and the threshold amount may be indicated in a message received from the wireless network 2. A message may then be sent from the user equipment 4 to the wireless network 2 indicating that data comprising the set of measurement data is ready to be sent, and the set may be sent in response to a request received at the user equipment.

Embodiments of the invention comprise mechanisms to reduce the amount of measurement results that a user equipment 4, which is configured to store/log measurement results in idle mode, needs to store. Rather than periodically storing measurement results, in embodiments of the invention the user equipment 4 may only stores the results if an event criterion, such as a value of a parameter having changed by more than a threshold amount from a value of the parameter in a previously stored set of measurement data, has been met. In embodiments of the invention, measured results may be stored only if the geographical position of the UE has changed more than a specified threshold value and/or if at least one of the measured results has changed more than a specified threshold value. Measured parameters may include a descriptor of a geographical location and an attribute of a radio signal, such as received power.

Conventionally, several mechanisms may be used to facilitate the collection of radio measurements aiming to Minimise the Drive Test (MDT) that operators normally perform when initially deploying wireless networks. User equipments operating in a E-UTRA network (E_UTRAN) may be configured to perform logging of available measurement results while in idle mode (RRC_IDLE) and possibly also while in connected mode (RRC_CONNECTED). Together with the available measurement results the UE stores the geographical location and the time applicable for each of the concerned measurement results. E-UTRAN may retrieve the concerned measurement information at a later stage i.e. when the UE is in connected mode (RRC_CONNECTED).

Conventionally, the user equipment (UE) may be required to perform measurements while being in idle mode i.e. to support UE-based mobility. However, the UE may not conventionally support any mechanism for storing/logging of measurements performed while the UE is in idle mode and for the delayed reporting of the measurement information. Conventionally, a UE that is in connected mode can be configured to perform measurement and to report the results, which is done immediately when a measured result becomes available.

The measurement configuration specified for use in E-UTRA connected mode consists of 3 main elements: measurement objects, measurement reporting, and measurement identity.

Measurement objects may be specified set of cells of a certain Radio Access Technology (RAT) type (for example all cells on an LTE frequency, a list of cells on a UMTS frequency, a list of GSM cells/frequencies).

Measurement reporting configurations may specify when the UE should trigger a measurement report as well as which information the UE may include in the measurement report. A measurement report may be triggered in case a particular 'event condition' is fulfilled e.g. a neighbour cell becomes a certain offset better than the current serving cell (event A3). A measurement report may also be triggered at regular intervals i.e. periodically, possibly up to a configurable number of times. The reporting configuration may specify which measurement quantities should be reported, the maximum number of cells that may be included (in order of measurement result i.e. best cell first).

Measurement identity may identify a measurement, linking a measurement object and a reporting configuration.

Figure 2:
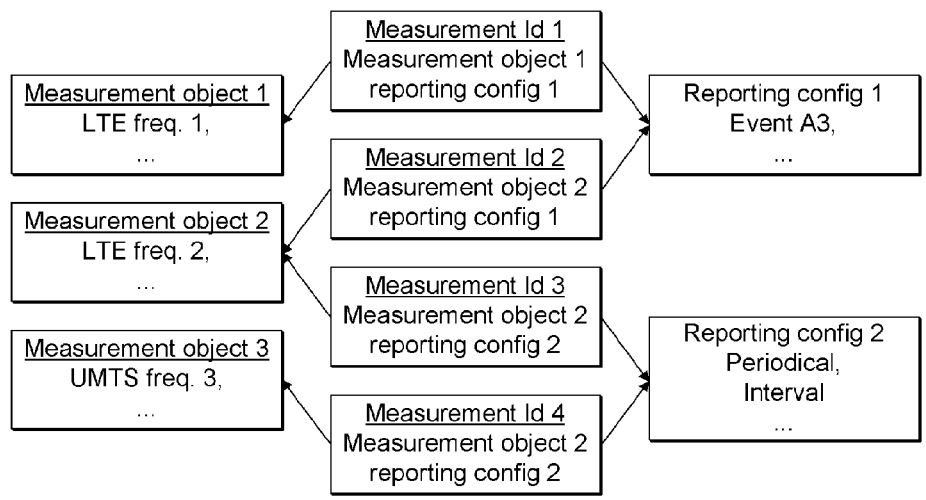
FIG. 2 is a schematic diagram illustrating a measurement configuration according to an embodiment of the invention.

FIG. 2 shows an example of a measurement configuration comprising 4 measurements. The measurement configuration for E-UTRA idle mode measurement may apply a similar model.

A potential problem with logging results in idle mode is the amount of measurement information to be stored. The following shows some typical values of parameters relevant for idle mode measurements for the purpose of minimising drive test (MDT). Conventionally, typical duration of measurement logging may be 1 hour, typical interval between logging measurement results may be 2.56 s, and typical size of individual measured result report (excluding time stamp) may be ~93-148 bits (including some ASN.1 overhead). Some example values of the size of individual measured result reports are as follows: measured values: 7-13, source ECGI: 28-54, location info: 48-96, and time stamp: 12-33. Hence, a hourly log size (periodical, i.e. without time stamp for every sample) may be 14-20 kB.

The estimated amount of information may not exceed the memory capacity of a user equipment, however the amount of information may increase the amount of data to be carried across signalling radio bearers and increase the amount of processing to be done at the network node(s) handling the measured information.

Hence, it is advantageous to reduce the amount of measurement information that is logged by a UE in idle mode.

The amount of information stored in idle mode may be reduced by reducing the number of log results and by the use delta signalling, i.e, sending information relating to differences from previously sent information.

One method of reducing the number of log results is to require the UE to store measurement results only when the quality of the serving cell is below a defined threshold value, since one aim of the minimising drive test (MDT) measurements is to discover areas in which the radio link quality is poor, that is to say coverage holes.

Regarding delta signalling, some parts of the parameters/ measurement information that the UE stores are often the same as the previously stored measurement information. In such a case the UE may store the value of the concerned part only if it is different from the previous value. Examples of parameters/parts for which this applies are as follows. The Public Land Mobile Network (PLMN) identity within the EUTRAN Cell Global Identifier (ECGI) is typically the same for many of the reported cells, and some parts of the time stamp fields are typically the same for many measurement results (e.g. for several measurements only the minutes & seconds fields differ).

According to embodiments of the invention, 'event triggered' storing/logging of measured results may be used to reduce the amount of measurement information stored in idle mode. In the following, a number of more specific uses of 'event triggered' storing/logging of measured results are described A measurement may be logged upon change of geographical location. One of the purposes of measurements at the user equipment, in particular of measurements for minimising drive test (MDT), is to obtain coverage plots i.e. maps indicating the radio quality applicable in different areas. For cases like this, it is desirable that the UE stores a measured value every time the position changes with a specified amount, which can either be configurable or fixed.

According to a first embodiment of the invention, The UE stores a measurement result only if the geographical location of the UE has changed more than a specified amount since the last time the UE stored a measurement result.

The geographical location, applicable for an MDT logged measurement may be provided by a Global Navigation Satellite Systems (GNSS) position estimate, in case the UE has an estimate available that is still valid, or by an 'RF fingerprint', that is to say bases on measured results for one or more radio quantities of a number of neighbouring cells.

According to a second embodiment of the invention, the UE stores a measurement result only if it has a valid GNSS position estimate that has changed more than a specified amount since the last time the UE stored a measurement result, so that for example the longitude has changed more than a specified amount (threshLo) and/or the latitude has changed more than a specified amount (threshLa).

According to the second embodiment, Embodiment the UE may regularly perform a GNSS positioning estimate. Since this can affect the battery consumption, GNSS positioning estimates may often not be available. In such cases the geographical location may be represented by an 'RF fingerprint', that is to say on the basis of a measurement of at least one radio signal received from the wireless network.

According to a third embodiment, the UE stores a measurement result only if the RF fingerprint has changed more than a specified amount since the last time the UE stored a measurement result. The change may be for example that a new cell has appeared in the list of the N best cells and/or the measured result of a quantity of one of the cells has changed more than a specified amount. The thresholds for GNSS and RF fingerprint can also either be fixed in the standard or configurable. There could, for example, be multiple thresholds e.g. one for GNSS, one for RF fingerprint, one or more for measurement result changes.

When the GNSS position estimate that the UE previously determined becomes invalid (e.g. after a specified time has elapsed), the UE may be unable to apply the second embodiment anymore and may revert to using the third embodiment. If the UE did not store the RF fingerprint information of the last logged measurement that is based on a GNSS position, it may store/log a measured result immediately when the GNSS position becomes invalid. This can be avoided by also storing the storing the RF fingerprint information of the last logged measurement i.e. by maintaining the two geographical location approaches in parallel.

According to embodiments of the invention, a measurement may be logged upon change of measured result. Radio coverage plots may only need to show in which areas the radio quality is below level x, in-between x and y, and so on. For cases like this, the UE may store a measured value every time the measured result changes with a specified amount, which can either be configurable or fixed. Also for cases of temporary disturbances of the radio link, a measured value may be logged/stored whenever the measured result changes more than a specified amount, which can either be configurable or fixed.

According to a fourth embodiment of the invention, the UE stores a measurement result only if at least one of the measured results has changed more than a specified amount since the last time the UE stored a measurement result.

According to embodiments of the invention, a measurement may be logged upon change of geographical location and/or change of measured result. For example, a measurement result may be logged when either the geographical location or the measured result changes with a specified amount, or when both the geographical location and the measured result change with a specified amount.

According to a fifth embodiment of the invention, the UE may store a measurement result only if the geographical location of the UE has changed more than a specified amount and/or at least one of the measured results has changed more than a specified amount since the last time the UE stored a measurement result.

The UE may store results only if both location and measured results have changed more than their respective thresholds.

Figure 3:
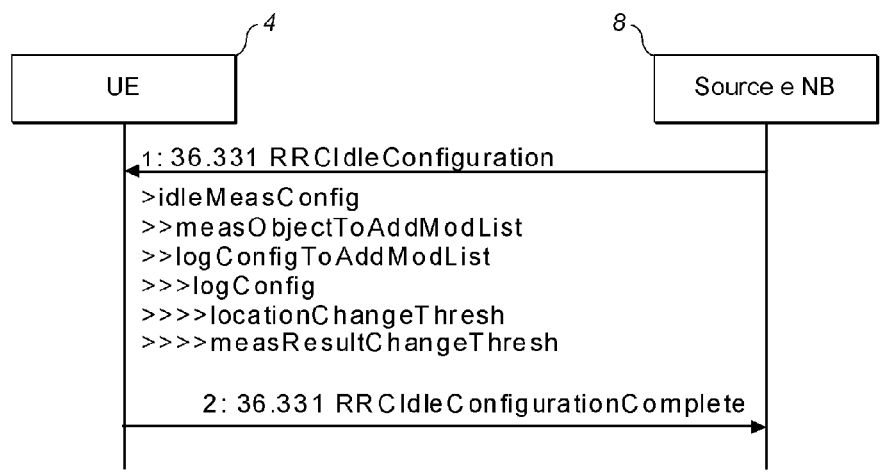
FIG. 3 is a schematic diagram illustrating transmission of messages according to an embodiment of the invention.
Figure 4:
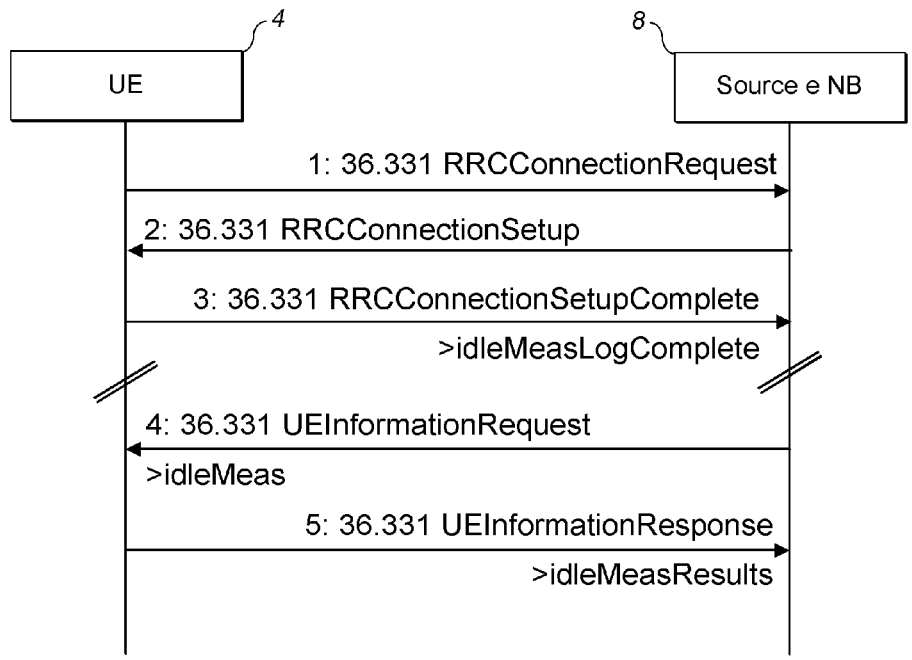
FIG. 4 is a schematic diagram illustrating transmission of messages according to an embodiment of the invention.

FIGS. 3 and 4 show message sequences according to embodiments of the invention.

FIG. 3 relates to configuration of the idle mode measurement, and FIG. 4 relates to transfer of the idle mode measurement results.

Referring to FIG. 3, the steps include the following:
1. E-UTRAN configures the UE to perform idle mode measurement logging by sending the RRCIdleConfiguration message including the field idleMeasConfig.

Embodiments of the invention may comprise an entry of the logConfigToAddModList as follows.
locationChangeThresh:
  if the change in UE position since the last time the UE logged a measurement result exceeds the value specified by this field, the UE may be triggered to store the actual measured results, for example according to the first embodiment of the invention.
  the field may appear in different variants i.e. to support GNSS and/or RF fingerprint and possibly others also, for example according to the second or third embodiments of the invention.
measResultChangeThresh:
  if the change in (one of the) measured results since the last time the UE logged a measurement result exceeds the value specified by this field, the UE may be triggered to store the actual measured results, for example according to the fourth embodiment of the invention.
  multiple thresholds may be signalled or alternatively a single value is signalled from which the different thresholds are derived Each of the new fields may be provided alone, or both fields may be provided together, for example according to the fifth embodiment of the invention.
2. The UE confirms the configuration of the idle configuration by returning an RRCIdleConfigurationComplete message.

Referring to FIG. 4, the steps include the following:
1. The UE initiates RRC connection establishment (for whatever reason) by sending the RRCConnectionRequest message
2. E-UTRAN establishes the connection by returning the RRCConnectionSetup message
3. The UE confirms the connection establishment by sending the RRCConnectionSetupComplete message. The message includes a field indicating that the logging of idle mode measurement results has been completed, meaning that E-UTRAN can retrieve the measurement information.
4. E-UTRAN requests the UE to provide the idle measurement results by sending the UEInformationRequest message including the field idleMeas
5. The UE returns the idle measurement results by sending the UEInformationResponse message It should be noted that the exact names of the messages, the information structure as well as the new parameters are merely examples. Moreover, the confirmation message is not essential and may be omitted.

Figure 5:
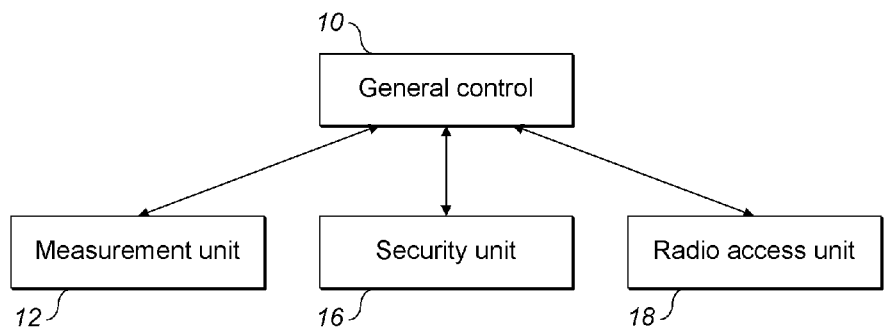
FIG. 5 is a schematic diagram showing functional blocks of a user equipment according to an embodiment of the invention.

FIG. 5 shows functional blocks of the user equipment that may be involved in embodiments of the invention, as a high level model of a user equipment.

The following briefly describes functional blocks which may be involved in embodiments of the invention. General control 10 handles the layer 3 protocol i.e. receiving, processing as well as preparation and sending of Radio Resource Control (RRC) messages. The measurement unit 12 performs the measurements that are configured by EUTRAN. The security unit 16 performs the integrity protection for Signalling Radio Bearers (SRBs), the ciphering for all radio Bearers (RBs) as well as the associated key derivations. The radio access unit 18 handles the layer 1 and 2 of the radio access protocols.

In embodiments of the invention, the functional blocks may behave as follows. The general control unit 10 handles the reception of the new fields within the logConfigToAddModList and configures the Measurement unit to report additional measurement. Information. At the measurement unit 12, aspects of the invention affect the way the logging of idle mode measurements is performed as well as the manner the measurement unit is configured and possibly the way the measurement results are reported. Event triggered reporting may require the use of a time stamp for each individual result.

Figure 6:
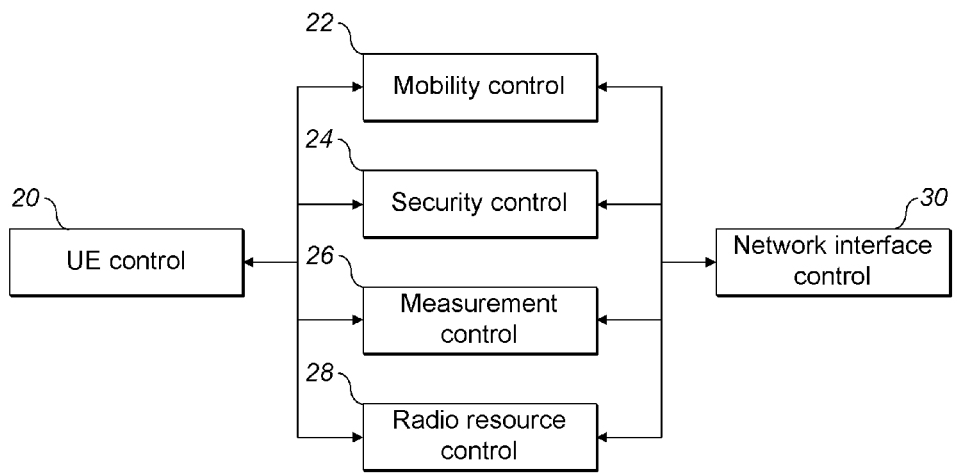
FIG. 6 is a schematic diagram showing functional blocks of an evolved Node B according to an embodiment of the invention.

FIG. 6 shows functional blocks of an evolved Node B (eNB) that may be involved in embodiments of the invention, as a high level model of an eNB.

The following briefly describes which functional blocks may be involved in embodiments of the invention. UE control 20 handles the layer 3 radio access protocol i.e. receiving, processing as well as preparation and sending of RRC messages. Network interface control 30 handles the similar functions for network interfaces. The measurement control 26 handles the configuration of the measurements functions in the UE and the eNB. The security control 24 handles the configuration of the security functions of the radio access i.e. integrity protection and the ciphering. The radio resource control 28 handles the configuration of layer 1 and 2 of the radio access protocols.

According to aspects of the invention, operation of the functional blocks may be as follows.

The UE control unit 20 may handle the sending of the new fields within the logConfigToAddModList as well as the reception of the possibly modified idle measurement information within a UEInformationResponse message, as well as the associated interactions with the Measurement control unit.

The Measurement control unit 26 may decide the details of the idle mode measurement configuration and hence the setting of the threshold values, if configurable. Furthermore, the unit may handle/process the idle mode measurement results, which are different in case the event triggered logging is performed according to the invention.

It should be noted that idle mode measurements could also be implemented by means a separate new functional blocks (i.e. 'Idle measurement unit').

Some embodiments of the invention are directed at idle mode measurements, as shown in the message sequence diagram of FIGS. 3 and 4. However, aspects of the invention is however equally applicable for logging of measurement results in connected mode i.e. for the logging in that state the same size concerns are applicable. Moreover, the same handling is applicable. One could consider introducing different threshold parameter for idle and connected mode.

Benefits provided by embodiments of the invention may include the reduction of processing of the idle mode measurement results as preferably only relevant measurement results may be stored. The amount of information to be transferred across signalling radio bearers may be reduced. Idle mode measurement results typically concern low priority information, so the transfer of this information should not delay the transfer of other, higher priority, signalling information; reducing the size of the idle measurement information may reduces the problem and may help to avoid the introduction of alternative solutions.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of managing storage of a set of measurement data, the method being suitable for use at a user equipment of a wireless network, the set of measurement data comprising a value of each of a plurality of parameters, the method comprising:
   receiving a request for measuring the plurality of parameters from the wireless network;
   measuring the plurality of parameters in response to the request, if usage of communication resources at the user equipment is below a predetermined value;
   determining whether a value of at least one parameter of the plurality of parameters has changed by more than a threshold amount from a value of the at least one parameter in a previously stored set of measurement data;
   only if the value has changed by more than the threshold amount and a quality of a serving cell is below a threshold value, storing the set of measurement data,
   wherein the at least one parameter comprises a Radio Frequency (RF) fingerprint.

2. The method according to claim 1, wherein the at least one parameter comprises a descriptor of a geographical location, and the threshold amount relates to changes in geographical location.

3. The method according to claim 2, wherein the descriptor of a geographical location is derived from a radio signal received from the wireless network.

4. The method according to claim 1, wherein the at least one parameter comprises a measured attribute of a radio signal, and the threshold amount relates to changes in the measured attribute.

5. The method according to claim 4, wherein the measured attribute of a radio signal comprises a power level.

6. The method according to claim 1, wherein the plurality of parameters includes at least a descriptor of a geographical location and a measured attribute of a radio signal.

7. The method according to claim 1, comprising receiving a message from the wireless network indicating the threshold amount.

8. The method according to claim 1, comprising sending a message to the wireless network indicating that data comprising the set of measurement data is ready to be sent.

9. The method of claim 8, wherein the measurement data is sent using delta signaling sending information relating to a difference from previously sent information.

10. The method according to claim 1, comprising sending the set of measurement data in a response to a request from the wireless network.

11. A User Equipment (UE) configured for use in a wireless network, the UE comprising:
   a communication unit configured to receive a request for measuring a plurality of parameters from the wireless network;
   a measurer configured to measure the plurality of parameters;
   a storage configured to store a set of measurement data; and
   at least one controller configured to control to:
      manage storage of the set of measurement data, the set of measurement data comprising a value of each of the plurality of parameters;
      measure the plurality of parameters in response to the request, if usage of communication resources at the user equipment is below a predetermined value;
      determine whether a value of at least one parameter of the plurality of measured parameters has changed by more than a threshold amount from a value of the at least one parameter in a previously stored set of measurement data; and
      only if the value has changed by more than the threshold amount and a quality of a serving cell is below a threshold value, store the set of measurement data,
   wherein at least one parameter comprises a Radio Frequency (RF) fingerprint.

* * * * *